UNITED STATES PATENT OFFICE.

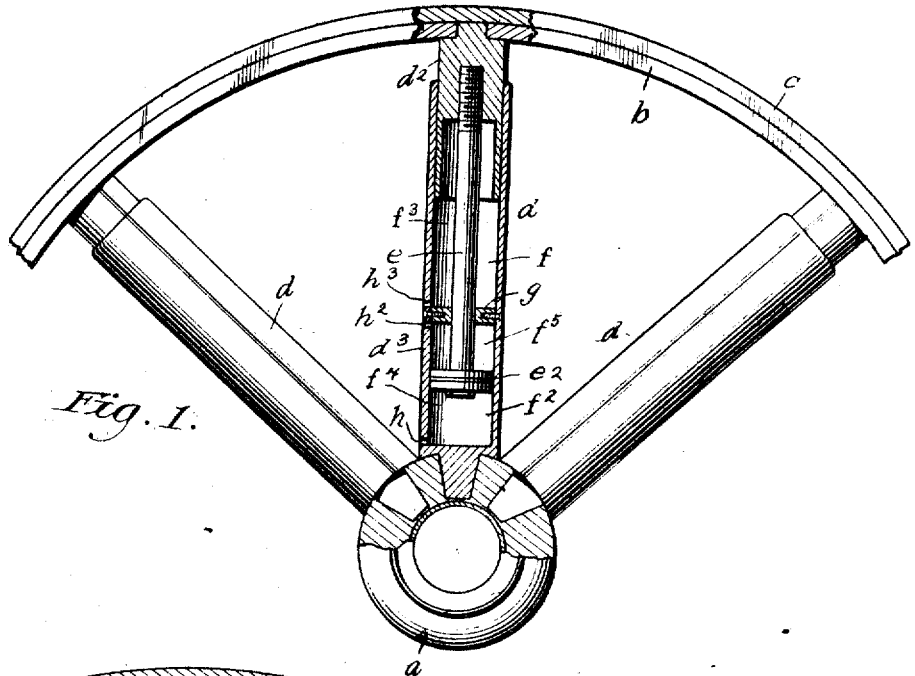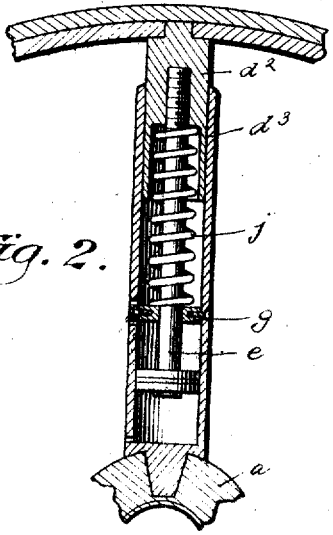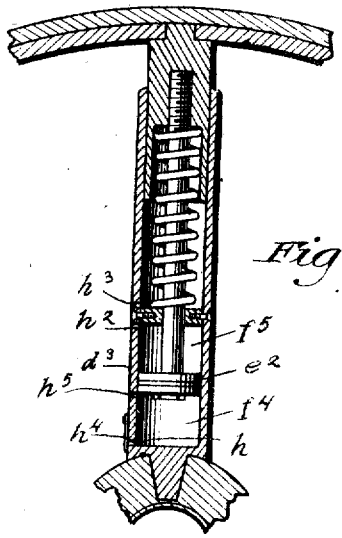

JOSEPH SOSS, OF NEW YORK, N. Y.

WHEEL.

No. 913,066.  Specification of Letters Patent.  Patented Feb. 23, 1909.

Application filed March 26, 1907. Serial No. 364,637.

*To all whom it may concern:*

Be it known that I, JOSEPH SOSS, a citizen of the United States, and residing at New York, in the county of New York and State of New York, have invented certain new and useful Improvements in Wheels, of which the following is a specification, such as will enable those skilled in the art to which it appertains to make and use the same.

This invention relates to what are known as cushioned wheels for vehicles, and the object thereof is to provide a wheel of this class in which the desired cushion effect is secured by the construction of the spokes which consist of separate telescopic parts, the hub of the wheel being supported centrally of the wheel when the latter is not in use but being freely movable radially of the wheel when the latter is in use, or the rim of the wheel being freely movable toward and from the hub in all positions of the wheel when said wheel is in use, the extent of such movement being controlled by the load on or in the vehicle and the construction of the spokes.

My invention as described and claimed herein is limited particularly to the construction of the spokes and any suitable rim and tire may be employed which will permit of the above described operation. In the accompanying drawing, I have shown an ordinary band rim and band tire and if such a construction were employed it would be necessary for both the band rim and the band tire to be flexible to a greater or less extent.

The invention is fully disclosed in the following specification, of which the accompanying drawing forms a part, in which the separate parts of my improvement are designated by suitable reference characters in each of the views, and in which:—

Figure 1 is a sectional side view of a part of a wheel the spokes of which are made according to my invention; Fig. 2 a view similar to Fig. 1 showing but a single spoke and a part of the tire, rim and hub and showing a modified form of the spoke; and, Fig. 3 a view similar to Fig. 2 and showing a slight modification thereof.

In the drawing forming part of this specification I have shown at $a$ the hub of a wheel and at $b$ the rim thereof on which is placed a tire $c$, and, in the form of construction shown, the rim and tire consist of ordinary bands and the hub $a$ is of the form usually employed in wagons and similar vehicles, but it will be understood that in making a wheel according to my invention any form of hub may be employed.

In the practice of my invention, as shown in Fig. 1, I provide spokes $d$ which consist of telescopic parts $d^2$ and $d^3$, one of which is connected with the rim and the other with the hub, and, in the form of construction shown, the part $d^2$ is connected with the rim and the part $d^3$ with the hub. The part $d^3$ is tubular in form throughout its length, and, in the form of construction shown, the inner end of the part $d^2$ is tubular in form and said part $d^2$ is provided with a piston rod $e$ with which is connected a piston $e^2$. The parts $d^2$ and $d^3$ because of their construction as above described form a longitudinal chamber $f$ within the spoke, and this chamber or that part thereof formed by the part $d^3$ of the spoke is provided with a stationary transverse partition $g$ which may be secured therein in any desired manner, but which, in the form of construction shown, is secured in said part $d^3$ of the spoke by means of screws passed through the latter and into said partition. The piston rod $e$ passes through the partition $g$, which is provided with a central aperture for this purpose, and said rod is so formed as to closely fit said aperture and the partition $g$ divides the chamber $f$ into an inner chamber $f^2$ and an outer chamber $f^3$. The piston $e^2$ is movable in the inner chamber $f^2$ of the spoke and said inner chamber is provided at its inner end with an air inlet and outlet port $h$, and at its outer end or adjacent to the partition $g$ with a similar air inlet and outlet port $h^2$, and the part $f^3$ of the chamber $f$ is provided at its inner end or adjacent to the partition $g$ with an air inlet and outlet port $h^3$. The inner end of the part $d^3$ of the spoke forms a cylinder in which the piston $e^2$ is movable, and said piston when the wheel is not in use, or when said wheel is not loaded, divides said cylinder into two separate chambers, an inner chamber $f^4$ and an outer chamber $f^5$. Only one of the spokes shown in Fig. 1 is shown in section, but it will be understood that all the spokes of the wheel are constructed in the same manner, and when the wheel is in use the load carried thereby will cause the tire and rim to move radially of the hub at all times, that part of the tire and rim on which the wheel rests being forced toward the hub, while the opposite part of the tire or rim will be forced away from the hub. In the inward movement of the piston $e$ the air in the chamber $f^4$ is forced out through the port $h$ while air is drawn into the chamber $f^5$ through the port $h^2$ and air is forced out of the chamber $f^3$ through the port $h^3$, and as said piston $e^2$ moves outwardly air passes into the chamber $f^3$ through the port $h$ out of the chamber $f^5$ through the port $h^2$ and into the chamber $f^3$ through the port $h^3$. It will be understood that the ports $h$, $h^2$ and $h^3$ are so formed as to regulate the passage of air therethrough, and this construction, as will be understood, forms a plurality of air cushions which control the movement of the piston $e$ in both directions and regulates such movement, and a constant spring action is given to the wheel as will be readily understood.

The construction shown in Fig. 2 is the same as that shown in Fig. 1 with the exception that a spiral spring $j$ is mounted on the piston rod $e$ in the chamber $f^3$ and bears on the partition $g$ and on the outer member $d^2$ of the spoke, and the spring $j$, as will be understood, forms a supplemental cushion which aids in regulating the movement of the part $d^2$ in the part $d^3$ of the spoke or in other words the movement of the tread portion of the rim and tire toward and from the hub of the wheel.

The construction shown in Fig. 3 is the same as that shown in Fig. 2, except that the air inlet and outlet port $h$ at the inner end of the cylinder in which the piston $e^2$ moves, or at the inner end of the chamber $f^4$, is provided with a valve $h^4$ which opens outwardly, and the cylinder or inner end portion of the part $d^3$ of the spoke is also provided a little below the middle thereof with another air inlet and outlet port $h^5$, and in the operation of this form of construction when the piston $e^2$ moves inwardly the air is forced out through the port $h$, but when said piston moves outwardly no air can enter the port $h$ and a vacuum is thus formed in the chamber $f^4$ or in the inner end of the cylinder which aids in regulating the outward movement of said piston. Normally, the piston $e^2$ is supposed to be in the position shown in Fig. 3, when this construction is employed, and when said piston is moved inwardly the port $h^5$ is closed during a part of said movement and the air in the chamber $f^4$ is forced out through the port $h$. At the extreme inward movement of the piston air may pass into the chamber $f^5$ through the port $h^5$ and in the outward movement of said piston the port $h^5$ will be closed and the air in the chamber $f^5$ will be forced out through the port $h^2$, but it will be understood that in all these movements of the piston $e^2$ the passage of air through the various ports $h$, $h^2$, $h^3$ and $h^5$ is slow and regular and the movement of the piston $e^2$ is thus regulated, the air in the various compartments or chambers forming cushions which control said movement, and if desired the piston $e^2$ may be provided with an upwardly directed rim which will keep the port $h^5$ closed during the entire inward movement of said piston.

In order for a wheel provided with my improved spokes to operate with a continuous rim or tire, as shown in Fig. 1, it will be necessary for said rim or tire to be flexible. The radial movement of said rim or tire would, however, be necessarily small and the flexible tire may be made in any desired manner.

Having fully described my invention, what I claim as new and desire to secure by Letters Patent, is:—

1. A spoke for wheels composed of separate telescopic members forming a hollow cylindrical chamber within said spoke, one member of the spoke being provided with a transverse partition which divides said chamber into separate sub-chambers and the other with a piston rod which passes through said partition and is provided with a piston movable in one of the sub-chambers, the sub-chamber in which the piston is movable being provided with air inlet and outlet ports at its inner and outer ends and the other sub-chamber being also provided with an air inlet and outlet port whereby air cushions are formed in the spoke to regulate the movement of the telescopic parts thereof.

2. A spoke for wheels composed of separate telescopic members forming a hollow cylindrical chamber within said spoke, one member of the spoke being provided with a transverse partition which divides said chamber into separate sub-chambers and the other with a piston rod which passes through said partition and is provided with a piston movable in one of the sub-chambers the sub-chamber in which the piston is movable being provided with air inlet and outlet ports at its inner and outer ends and the other sub-chamber being also provided with an air inlet and outlet port whereby air cushions are formed in the spoke to regulate the movement of the telescopic parts thereof, and a spiral spring placed in one of the sub-chambers and serving as a cushion to regulate the movement of said parts.

3. A spoke for wheels composed of separate telescopic members whereby a longitudinal chamber is formed in said spoke, said chamber being divided into separate sub-chambers and one part of the spoke being provided with a piston movable in one of said sub-chambers and all of said sub-chambers being provided with air ports.

4. A wheel comprising a hub, a flexible rim and tire, and spokes composed of separate telescopic parts forming a longitudinal piston chamber divided by a transverse partition so as to form two supplemental chambers, one part of the spoke operating as a plunger in one of said supplemental chambers and being provided with a rod which passes therethrough and through said partition, and is provided with a piston movable in the other supplemental chamber, said supplemental chambers being both provided with air ports or passages.

5. A wheel comprising a hub, a flexible rim and tire, and spokes composed of separate telescopic parts forming a longitudinal piston chamber divided by a transverse partition so as to form two supplemental chambers, one part of the spoke operating as a plunger in one of said supplemental chambers and being provided with a rod which passes therethrough and through said partition, and is provided with a piston movable in the other supplemental chamber, said supplemental chambers being both provided with air ports or passages, and a spring placed between said partition and that part of the spoke with which said rod is connected.

In testimony that I claim the foregoing as my invention I have signed my name in presence of the subscribing witnesses this 25th day of March 1907.

JOSEPH SOSS.

Witnesses:
C. E. MULREANY,
A. WORDEN GIBBS.